United States Patent [19]

Deutscher et al.

[11] 4,421,670
[45] Dec. 20, 1983

[54] LIQUID CRYSTAL DIHYDROPHENANTHRENE SUBSTANCES

[75] Inventors: Hans-Joachim Deutscher, Halle; Sabine Richter, Haldesleben; Horst Zaschke, Halle; Dietrich Demus, Halle; Ute Böettger, Halle, all of German Democratic Rep.

[73] Assignee: VEB Werk für Fernsehelektronik Berlin im VEB Kombinat Mikroelektronik, Berlin-Oberschoneweide, German Democratic Rep.

[21] Appl. No.: 302,287

[22] Filed: Sep. 14, 1981

[30] Foreign Application Priority Data

Sep. 16, 1980 [DD] German Democratic Rep. ... 223829
Sep. 16, 1980 [DD] German Democratic Rep. ... 223841

[51] Int. Cl.³ .......................... C09K 3/34; G02F 1/13; C07C 69/76; C07C 121/64
[52] U.S. Cl. .......................... 252/299.62; 260/465 D; 350/350 R; 546/286; 560/5
[58] Field of Search .............. 260/465 D; 252/299.62; 560/5; 546/286; 350/350 R

[56] References Cited

U.S. PATENT DOCUMENTS 3,655,694 5/1972 Lee et al. .................................. 560/5

OTHER PUBLICATIONS

Canceill et al., Chemical Abstracts, vol. 84: 114471u (1974).

Primary Examiner—Dolph H. Torrence
Attorney, Agent, or Firm—Jordan and Hamburg

[57] ABSTRACT

This invention relates to new liquid crystal dihydrophenanthrene substances for utilization in electro-optical devices for the modulation of light as well as the representation of numerals, signs and images. It has been found that new liquid-crystal 7-n-alkyl-8, 10-dihydrophenanthrene-2-carboxylic acid esters of the general formula

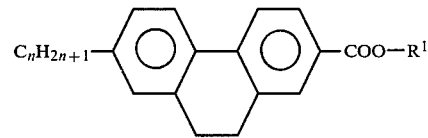

alone, in mixture with each other and/or in mixtures with other liquid crystal or non liquid crystal substances, yield good results when they are used in electro-optical components.

19 Claims, No Drawings

LIQUID CRYSTAL DIHYDROPHENANTHRENE SUBSTANCES

BACKGROUND OF THE INVENTION AND PRIOR ART STATEMENT

This invention relates to the application of new nematic liquid crystal substances in electro-optical devices for the modulation of the incident or traversing light as well as for the representation of numerals, signs and images.

A wide variety of substances and mixtures for electro-optical components have already been proposed up to now (D. Demus in: *Nonemissive Electro-optic Display*, ed. by R. A. Kmetz and F. K. v. Willisen, Plenus Press, New York-London, 1976, P. 83–117; V. V. Titov, Proceed. 3rd Liquid Crystal Conference of Soc. Countries, Budapest 1978; G. Weber, P. del Pino, L. Pohl, Proceed. "10. Freiburger Arbeitstagung Flussigkristalle" 1980).

The further development of the components as well as their utilization in other fields of application requires the availability of substances, the qualities of which have to be increasingly improved and adjusted to special purposes. Therefore, to aid in the modification of these qualities, new compounds are required that are derived from new classes of liquid crystal substances.

Up to now the prior art has only disclosed 2-(4-n-alkoxybenzyldenamino)-phenanthrene, as well as some 8,10-dihydrophenanthrenes with alkyl and acyl substituents as liquid crystal substances, (J. Conceill, J. Billard; J. Jaques: Chem. and Ind. (London) 1974, 615; J. Conceill, C. Crea, J. Billard, J. Jaques: Pramana Suppl. 1, 1975, 397). No processes for the manufacture of the substances of this invention have been disclosed up to now.

The object of this invention is nematic liquid crystal-substances with high clear points, low threshold voltage as well as sufficient supercooling ability in electrical fields for electro-optical devices as well as the processes for their production.

SUMMARY OF THE INVENTION

It has been found, that the application of the new liquid crystal 7-n-alkyl-8,10-dihydrophenanthrene-2-carboxylic acid ester of the general formula

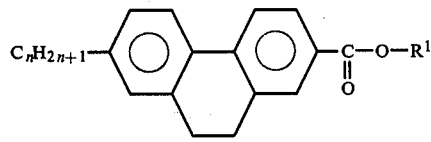

wherein $R^1 = -C_nH_{2n+1}$,

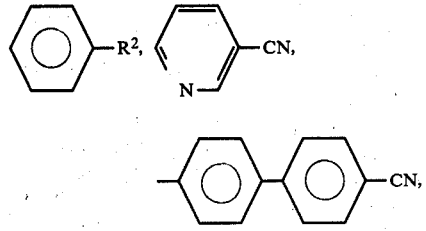

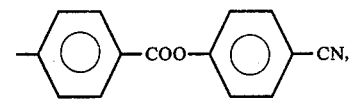

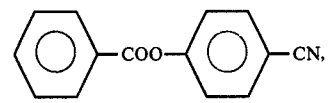

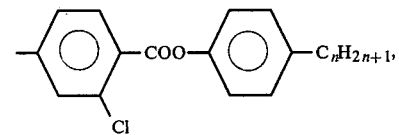

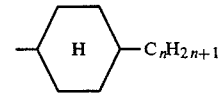

$R^2 = -C_nH_{2n+1}$, $-OC_nH_{2n+1}$, $-CN$, $-Cl$, $-Br$, $-CF_3$, $-CH_2-CH_2-CN$, $-CH=C(CN)_2$ with n equal from 1 to 10, either alone or in a mixture with each other and/or in mixtures with other liquid crystal or non-liquid crystal substances, produces good results. The substances of this invention are colorless, very stable, resistant to air, chemical influences, elevated temperatures and electrical fields. They can be produced with a high degree of purity, resulting in high yields.

DETAILED DESCRIPTION OF PREFERRED EMBODIMENTS

It has been found that new 7-n-alkyl-8,10-dihydrophenanthrene-2-n-carboxylic acid ester can be produced through catalytic high-pressure hydrogenation of phenanthrene, Friedel-Crafts-acylation of the produced 8,10-dihydrophenanthrene in the 2-position and reduction by hydrazine hydrate to 2-n-alkyl-8,10-dihydrophenanthrene, acetylation according to Friedel-Crafts in nitrobenzenes at temperatures below 0° C. in a 7-position as well as oxidation in a haloform reaction into carboxylic acid, production of the acyl chloride through heating with thionyl chloride as well as reaction of the equivalent quantities of acyl chloride with a hydroxy compound corresponding to the following reaction diagram:

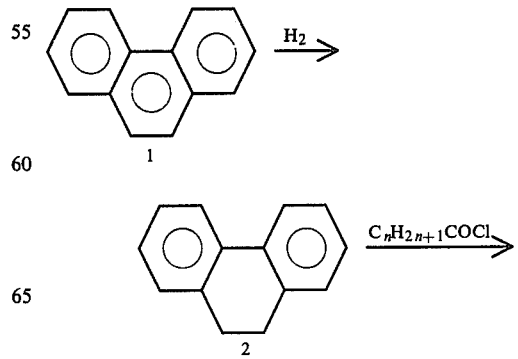

-continued

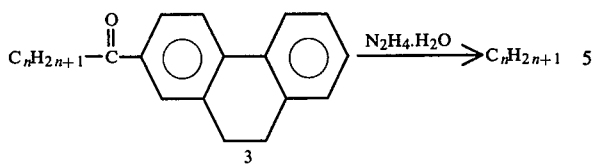

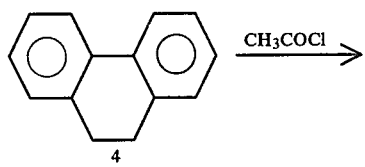

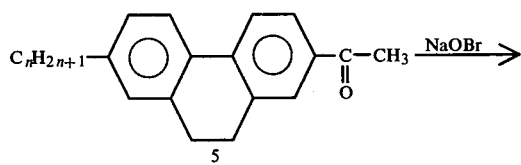

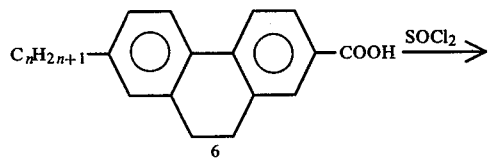

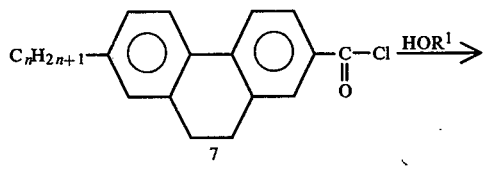

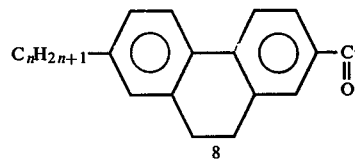

The invention will now be explained in more detail by way of eight examples.

EXAMPLE 1

The following table lists the conversion temperatures of some substances according to this invention. The abbreviations mean:

K = solid-crystal
N = nematic
is = isotropic-liquid
Fp = melting point
Clp = clear point

TABLE 1

$C_nH_{2n+1}$—[ring system]—C(=O)—O—R$^1$

| Comp. | n | R$^1$ | K | N | I |
|---|---|---|---|---|---|
| 1 | 4 | —⟨O⟩—OC$_6$H$_{13}$ | 92–93 | 171 | . |
| 2 | 4 | —⟨O⟩—OC$_7$H$_{15}$ | 94 | 158 | . |
| 3 | 4 | —⟨O⟩—C$_4$H$_9$ | 82–83 | 142 | . |
| 4 | 4 | —⟨O⟩—CN | 99–100 | 202 | . |
| 5 | 4 | —⟨O⟩—C$_2$H$_4$CN | 108–109 | 152 | . |
| 6 | 4 | —⟨H⟩—C$_4$H$_9$ | 68–69 | 116 | . |
| 7 | 4 | —⟨H⟩—C$_5$H$_{11}$ | 70 | 144 | . |
| 8 | 5 | —⟨O⟩—OC$_6$H$_{13}$ | 80 | 169 | . |
| 9 | 5 | —⟨O⟩—OC$_7$H$_{15}$ | 89–90 | 165 | . |
| 10 | 5 | —⟨O⟩—C$_4$H$_9$ | 74–75 | 140 | . |
| 11 | 5 | —⟨O⟩—CN | 109–110 | 198 | . |
| 12 | 5 | —⟨O⟩—C$_2$H$_4$CN | 94 | 161 | . |
| 13 | 5 | —⟨O(Cl)⟩—COO—⟨O⟩—C$_5$H$_{11}$ | 88 | 258 | . |

EXAMPLE 2

The mixture Mi 14 has the following composition and qualities:
4-n-propylcyclohexane-carboxylic-acid-4-cyanophenylester: 34.5 mol.%
4-n-butylcyclohexane-carboxylic-acid-4-cyanophenylester: 31. mol.%
4-n-pentylcyclohexane-carboxylic-acid-4-cyanophenylester: 34.5 mol.%
Clear point: 72° C.    Fp 10° to 14° C.
Threshold voltage: U$_o$=1.4 V    twist cell
Layer thickness: d=20 μm; 23° C.; 500 Hz
This mixture is modified as followed through the addition of the substances of this invention:

| Comp. No. | mol-% | Composition Mi 14 mol-% | Clp. | Fp | $U_o/V$ |
|---|---|---|---|---|---|
| 12 | 10 | 90 | 82.2 | 5–0 | 2 |
| 12 | 20 | 80 | 91.2 | 13.5–15 | 1.9 |
| 4 | 10 | 90 | 86.6 | 10–13 | 1.4 |
| 4 | 20 | 80 | 100.7 | 13–16 | 1.7 |

EXAMPLE 3

2-acyl-8,10-dihydrophenanthrene 3

50 g (0.28 mol) 8,10-dihydrophenanthrene 2 (through a 30–40 hour catalytic hydrogenation of 100 g phenanthrene 1 in 300 ml abs. ethanol and 11 g copper-chromite-catalyst (W. Falkers, H. Adkins: J. Amer. Chem. Soc. 54, 1138 (1932) produced at 220° C. and 15 MPa hydrogen pressure in autoclaves) are dissolved in 100 ml nitrobenzene and subsequently mixed with 0.3 mol of a corresponding acylchloride. The mixture is then cooled off to −10° C., 40 g (0.3 mol) $AlCl_3$ is added under stirring, the mixture then stirred for another 3 hours (−10° to 0° C.) and left overnight at 0° C. The reaction mixture is poured over ice/HCl, left standing for 24 hours, the organic phase is separated, the solvent distilled out and the residue fractionally distilled. The yields are 70 to 80% of theoretical:

3.1.  m=3  clear point: 134° C./0.07 kPa
3.2.  m=4  clear point: 154° C./0.05 kPa

EXAMPLE 4

2-n-alkyl-8,10-dihydrophenanthrene 4

0.2 mol 3, 24 g (0.6 mol) 80% $N_2H_4.H_2O$, 45 g (0.8 mol) finely pulverized caustic potash and 200 ml triglycol are heated for four hours under reflux, wherein a strong $N_2$ evolution takes place. Thereafter, the flask is provided with a distillation device, the temperature then being slowly increased to 240° C. and held at that level until the formation of $N_2$ has ended (hydrazine and water herein are separated by distillation). After cooling off, the reaction mixture is mixed with an equal amount of water, extracted with ether, chloroform or carbon tetrachloride and after separation of the extract, fractionally distilled in a vacuum. The yields are 80% of theoretical:

4.1.  n=4  clear point: 120°–123° C./0.02 kPa
4.2.  n=5  clear point: 130°–132° C./0.05 kPa

EXAMPLE 5

7-acetyl-2-n-alkyl-8,10-dihydrophenanthrene 5

7.9 g (0.1 mol) acetyl chloride is slowly added, drop by drop to 0.1 mol 4 in 60 ml nitrobenzene, with 28.6 g (0.2 mol) $AlCl_3$ subsequently added in increments, at temperatures around 5° C.

The reaction residue is left standing overnight at 0° C., and thereafter poured over ice/HCl, with the organic phase separated and fractionally distilled in a vacuum. The yields are 50 to 60% of theoretical:

5.1.  n=4  clear point: 163° C./0.1 kPa
5.2.  n=5  clear point: 160° C./0.83 kPa

EXAMPLE 6

7-n-alkyl-8,10-dihydrophenanthrene-2-carboxylic acid 6

12 g (0.15 mol) bromine is added, drop by drop, to 20 g (0.6 mol) NaOH in 100 ml $H_2O$ under vigorous stirring and cooling in such a way that the temperature remains below 10° C. The solution is cooled off to 0° C. and 0.05 mol 5 in 50 ml diethylene dioxide is added. Thereafter, the mixture is stirred for one hour at room temperature (the end of the reaction can be recognized by a temperature increase), the bromoform is removed with steam, and the crude acid is then precipitated through the introduction of $SO_2$. 6 is re-crystallized from toluene or methanol. The yield is 50% of the theoretical:

6.1.  n=4  clear point: 221 N 230 I
6.2.  n=5  clear point: 205 N 235 I

EXAMPLE 7

7-n-alkyl-8,10-dihydrophenanthrene-2-carboxylic acid chloride 7 and 0.01 mol 6 are added to 15 to 25 ml thionyl chloride with a few drops of pyridine, the mixture then being heated for 5 to 6 hours in a water bath. After distilling out the excess $SOCl_2$, 7 is esterfied without further purification.

EXAMPLE 8

7-n-alkyl-8,10-dihydrophenanthrene-2-carboxylic acid ester 8 and 0.01 mol 7 (synthesized according to Example 7) in 20–40 ml pyridine are added to 0.01 mol of a corresponding alcohol or phenol and stirred vigorously. The mixture is left standing overnight, then heated for 30 minutes in a boiling water bath. After cooling off, the mixture is poured over ice/conc. $H_2SO_4$ (120 g/28 ml), and the precipitate absorbed in ether, the ether extract being successively washed in a bicarbonate solution, water, dilute hydrochloric acid and water. Thereafter the mixture is dried, the solvent distilled off, and the residue re-crystallized out of 4 to 5 mol methanol. The yields are 70 to 80% of theoretical.

We claim:

1. 7-n-alkyl-8,10-dihydrophenanthrene-2-carboxylic acid esters of the general formula

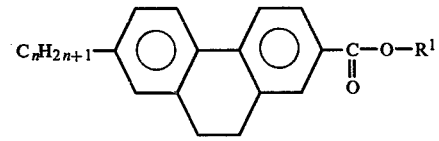

wherein $R^1=C_nH_{2n+1}$,

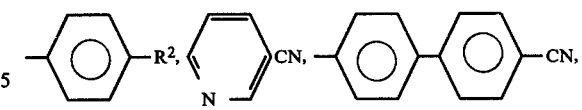

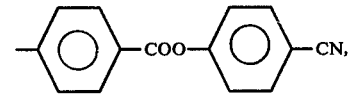

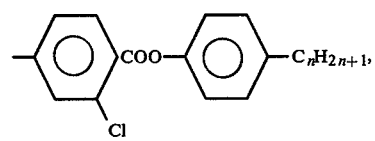

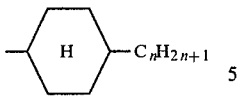

$R^2 =$ —$C_nH_{2n+1}$, —$C_nH_{2n+1}O$, —CN, —Cl, —Br, —$CF_3$, —$CH_2$—$CH_2$—CN—CH=$C(CN)_2$
with n equal to 1 to 10.

2. A 7-n-alkyl-8,10-dihydrophenanthrene-2-carboxylic acid ester according to claim 1, characterized in that

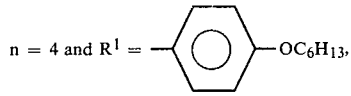

having the formula

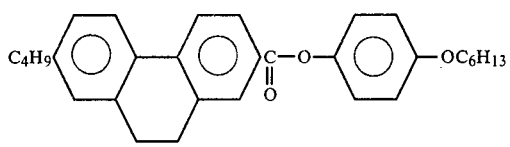

3. A 7-n-alkyl-8,10-dihydrophenanthrene-2-carboxylic acid ester according to claim 1, characterized in that n=4 and $R^1$=$OC_7H_{15}$, having the formula

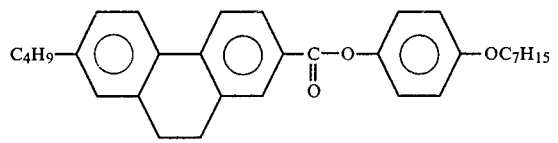

4. A 7-n-alkyl-8,10-dihydrophenanthrene-2-carboxylic acid ester according to claim 1, characterized in that

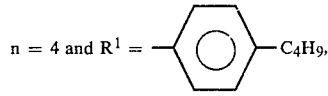

having the formula

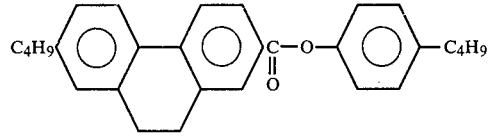

5. A 4-n-alkyl-8,10-dihydrophenanthrene-2-carboxylic acid ester according to claim 1, characterized in that

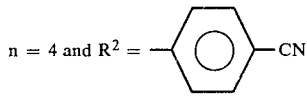

having the formula

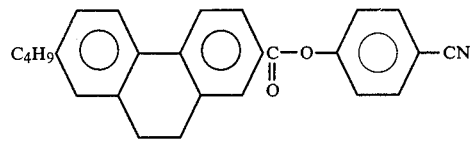

6. A 4-n-alkyl-8,10-dihydrophenanthrene-2-carboxylic acid ester according to claim 1, characterized in that

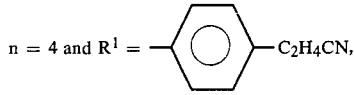

having the formula

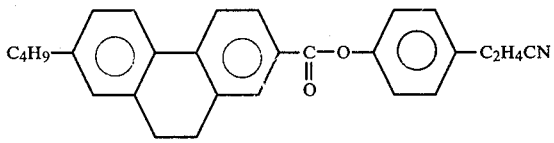

7. A 4-n-alkyl-8,10-dihydrophenanthrene-2-carboxylic acid ester according to claim 1, characterized in that

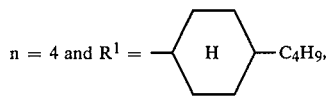

having the formula

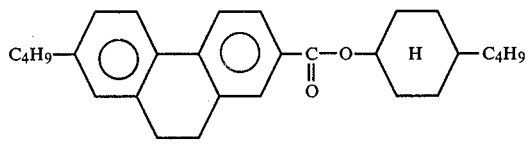

8. A 4-n-alkyl-8,10-dihydrophenanthrene-2-carboxylic acid ester according to claim 1, characterized in that

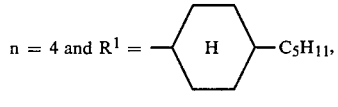

having the formula

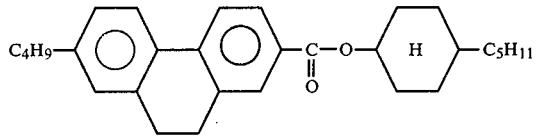

9. A 4-n-alkyl-8,10-dihydrophenanthrene-2-carboxylic acid ester according to claim 1, characterized in that n = 5 and R² = 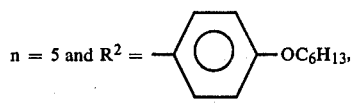 —OC₆H₁₃, having the formula

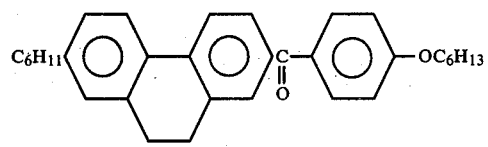

10. A 4-n-alkyl-8,10-dihydrophenanthrene-2-carboxylic acid ester according to claim 1, characterized in that n = 5 and R¹ = 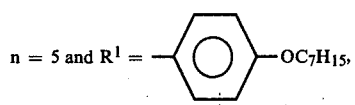 —OC₇H₁₅, having the formula

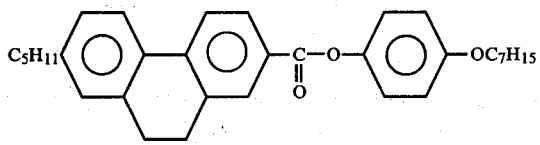

11. A 4-n-alkyl-8,10-dihydrophenanthrene-2-carboxylic acid ester according to claim 1, characterized in that n = 5 and R¹ = 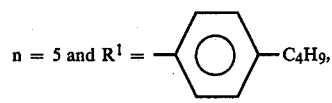 —C₄H₉, having the formula

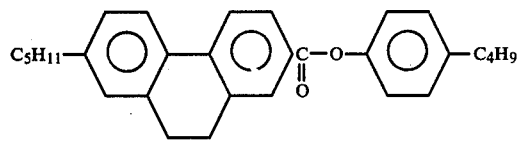

12. A 4-n-alkyl-8,10-dihydrophenanthrene-2-carboxylic acid ester according to claim 1, characterized in that n = 5 and R¹ = 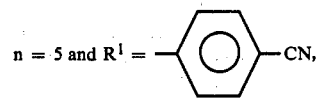 —CN, having the formula

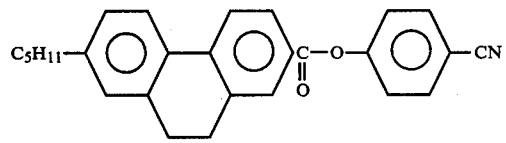

13. A 4-n-alkyl-8,10-dihydrophenanthrene-2-carboxylic acid ester according to claim 1, characterized in that n = 5 and R¹ = 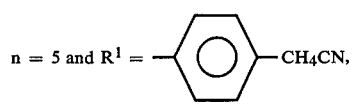 —CH₄CN, having the formula

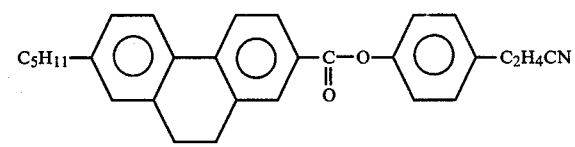

14. A 4-n-alkyl-8,10-dihydrophenanthrene-2-carboxylic acid ester according to claim 1, characterized in that n = 5 and R¹ = 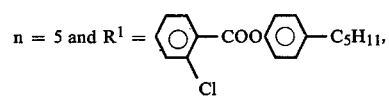

having the formula

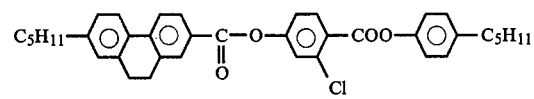

15. A nematic liquid crystal composition for modulation of incident and traversing light, and for representation of numerals, signs, and images in electro-optical devices, comprising at least one liquid crystal 7-n-alkyl-8,10-dihydrophenanthrene-2-carboxylic acid ester of claim 1.

16. The composition of claim 15 wherein said 7-n-alkyl-8,10-dihydrophenanthrene-2-carboxylic acid ester is mixed with at least one other nematic liquid crystal substance of different structure.

17. The composition of claim 16 wherein said 7-n-alkyl-8,10-dihydrophenanthrene-2-carboxylic acid ester is mixed with at least one other non-liquid crystal substance.

18. A process for preparing a 7-n-alkyl-8,10-dihydrophenanthrene-2-carboxylic acid ester of claim 1, comprising the steps of (A) catalytically hydrogenating phenanthrene(I) under high pressure,

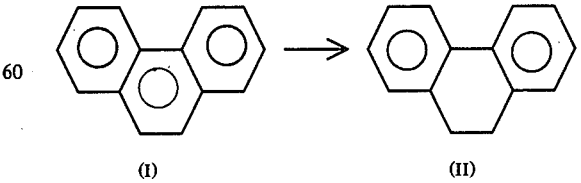

(B) acylating the resultant 8,10-dihydrophenanthrene(II) in the 2-position by a Friedel-Crafts reaction,

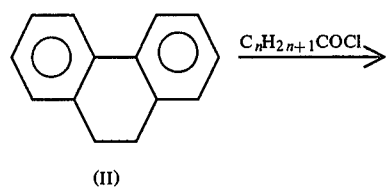

(II)

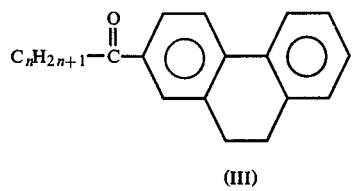

(III)

(C) reducing the resultant 2-n-acyl-8,10-dihydrophenanthrene(III) with hydrazine hydrate,

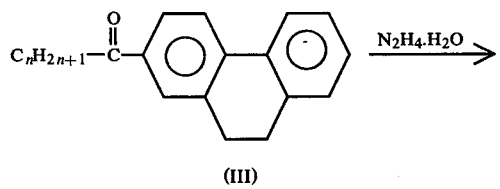

(III)

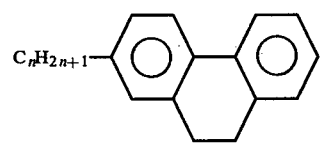

(IV)

(D) acetylating the resultant 2-n-alkyl-8,10-dihydrophenanthrene(IV) in the 7-position by a Friedel-Crafts reaction in nitrobenzene at a temperature below 0° C.,

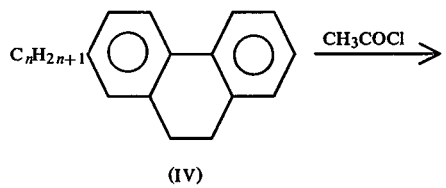

(IV)

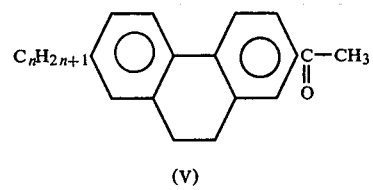

(V)

(E) oxidizing the resultant 7-n-alkyl-2-n-acetyl-8,10-dihydrophenanthrene(V) into carboxylic acid,

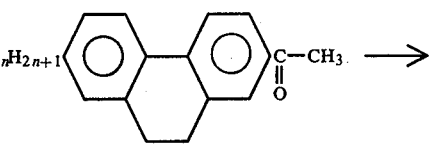

(V)

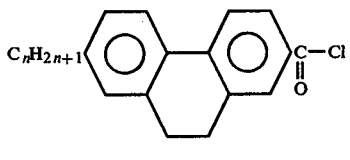

(VI)

(F) heating the resultant 7-n-alkyl-8,10-dihydrophenanthrene-2carboxylic acid in the presence of thionyl chloride to form the corresponding 7 acyl chloride,

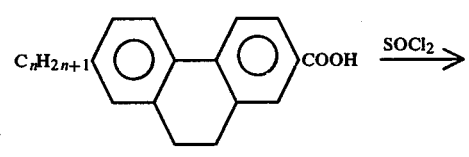

(VI)

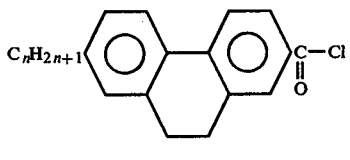

(VII)

and (G) reacting approximately equivalent quantities of the 7-n-alkyl-8,10-dihydrophenanthrene-2-acyl chloride with an hydroxy compound of formula $R^1OH$, to form the 7-n-alkyl-8,10-dihydrophenanthrene-2-carboxylic acid ester of claim 1.

19. An electro-optical device comprising the nematic, liquid crystal composition of claim 15.

* * * * *